United States Patent
Suijver et al.

(10) Patent No.: US 9,795,244 B2
(45) Date of Patent: Oct. 24, 2017

(54) APPARATUS FOR, AND METHOD OF, MIXING A POWDER IN A LIQUID

(71) Applicant: KONINKLIJKE PHILIPS N.V., Eindhoven (NL)

(72) Inventors: Jan Frederik Suijver, Dommelen (NL); Anke Gerda Sinnema, Opeinde (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 5 days.

(21) Appl. No.: 14/366,117

(22) PCT Filed: Nov. 26, 2012

(86) PCT No.: PCT/IB2012/056746
§ 371 (c)(1),
(2) Date: Jun. 17, 2014

(87) PCT Pub. No.: WO2013/093673
PCT Pub. Date: Jun. 27, 2013

(65) Prior Publication Data
US 2014/0361052 A1    Dec. 11, 2014

Related U.S. Application Data

(60) Provisional application No. 61/578,945, filed on Dec. 22, 2011.

(30) Foreign Application Priority Data

Dec. 22, 2011    (EP) .................................... 11195141

(51) Int. Cl.
*B05B 7/00*    (2006.01)
*A47J 31/40*    (2006.01)

(52) U.S. Cl.
CPC ........... *A47J 31/404* (2013.01); *A47J 31/407* (2013.01)

(58) Field of Classification Search
CPC ....... A47J 31/404; A47J 31/407; B24C 9/003; B24C 7/0046; B05B 11/061;
(Continued)

(56) References Cited

U.S. PATENT DOCUMENTS 1,142,636 A  *  6/1915  Singer .................. B05B 11/062
                                                      222/209
6,056,204 A    5/2000  Glezer et al.
(Continued)

FOREIGN PATENT DOCUMENTS

WO    2009055459 A1    4/2009

OTHER PUBLICATIONS

Barton L. Smith et al, "The formation and evolution of synthetic jets", Physics of Fluids, vol. 10, No. 9, Sep. 1998, pp. 2281-2297.
(Continued)

*Primary Examiner* — Frederick C Nicolas
*Assistant Examiner* — Bob Zadeh

(57) ABSTRACT

An apparatus for mixing a powder in a liquid includes a cavity for holding a powder, a passageway communicating with the cavity, and a flow actuator for inducing an oscillating gas flow in the passageway. As the gas flow oscillates in the passageway, the powder is drawn into the passageway from the cavity when the gas flows in a first direction during a suction phase, and the powder is expelled from the passageway towards a liquid by synthetic jetting when the gas flows in a second direction opposite the first direction during a blowing phase.

13 Claims, 2 Drawing Sheets

(58) Field of Classification Search
CPC ... B05B 11/062; B05B 11/067; B05B 11/068; F04F 5/10; F04F 5/24
See application file for complete search history.

(56) References Cited

U.S. PATENT DOCUMENTS

| | | | |
|---|---|---|---|
| 7,140,522 B2 * | 11/2006 | Kress | A45D 19/16 |
| | | | 132/201 |
| 7,779,837 B2 | 8/2010 | Gumaste et al. | |
| 8,444,012 B2 | 5/2013 | Bergdahl | |
| 2005/0183724 A1 | 8/2005 | Gumaste et al. | |
| 2008/0102178 A1 * | 5/2008 | Thakur | A23F 5/405 |
| | | | 426/511 |
| 2008/0174620 A1 * | 7/2008 | Tanner | B41J 2/14201 |
| | | | 347/10 |
| 2008/0202514 A1 * | 8/2008 | Kriksunov | A61M 11/005 |
| | | | 128/203.15 |
| 2010/0021322 A1 * | 1/2010 | Kitahara | F04B 43/04 |
| | | | 417/413.2 |
| 2010/0121261 A1 * | 5/2010 | Kablik | A61K 31/74 |
| | | | 604/58 |
| 2014/0361052 A1 * | 12/2014 | Suijver | A47J 31/407 |
| | | | 222/630 |

OTHER PUBLICATIONS

Ryan Holman et al, "Formation Criterion for Synthetic Jets", AIAA Journal, vol. 43, No. 10, Oct. 2005, pp. 2110-2116.

* cited by examiner

APPARATUS FOR, AND METHOD OF, MIXING A POWDER IN A LIQUID

CROSS-REFERENCE TO PRIOR APPLICATIONS

This application is the U.S. National Phase application under 35 U.S.C. §371 of International Application No. PCT/IB2012/056746, filed on Nov. 26, 2012, which claims the benefit of U.S. Provisional Pat. App. Ser. No. 61/578,945 filed Dec. 22, 2011 and European Patent Application No. 11195141.4, filed on Dec. 22, 2011. These applications are hereby incorporated by reference herein.

FIELD OF THE INVENTION

The present invention relates to an apparatus for mixing a powder in a liquid. The present invention also relates to a method of mixing a powder in a liquid.

BACKGROUND OF THE INVENTION

A number of applications require the mixing of powder particles in a liquid. Such an application includes the addition of baby formula into water, or a creamer into a hot drink, for example coffee.

Mixing a powder in a liquid is generally achieved through the use of mechanical agitation, such as vigorous stirring, vibration and/or shaking of a container containing both a liquid and the powder. However, it is difficult to effectively mix a powder in a liquid, and there are several known problems associated with doing so. In the first instance, a powder does not tend to dissolve homogeneously in a liquid and so lumps form in the mixture. Secondly, it is known for the powder to float on the surface of the liquid. Furthermore, the powder is known to adhere to a mechanical agitator, such as a stirring element.

US2008/102178 discloses a method and apparatus for reconstituting consumable powder(s) with a liquid to provide a food liquid such as milk.

SUMMARY OF THE INVENTION

Therefore, it is an object of the invention to provide an apparatus for mixing a powder in a liquid and a method of mixing a powder in a liquid which substantially alleviates or overcomes the problems mentioned above.

According to the present invention, there is provided an apparatus for mixing a powder in a liquid comprising a cavity for holding a powder, a passageway communicating with the cavity, and a flow actuator for inducing an oscillating gas flow in the passageway so that a powder is drawn into the passageway from the cavity when the gas flows in one direction and the powder is expelled from the passageway towards a liquid by synthetic jetting when the gas flows in the opposite direction.

Conveniently, the passageway further comprises an outlet nozzle through which a powder is expelled by synthetic jetting from the passageway.

Advantageously, the cavity is disposed along the passageway.

In one embodiment, the cavity is disposed along the passageway between the flow actuator and the outlet nozzle.

The cavity may be disposed adjacent to the outlet nozzle.

The apparatus may be configured to hold a container of liquid in which a powder is to be mixed.

Conveniently, the passageway defines a longitudinal axis, and the longitudinal axis of the passageway is configured to extend at an angle towards a surface of a liquid received in a container held by the apparatus.

In one embodiment, the cavity is removable from the passageway.

The cavity may form part of a disposable capsule.

Advantageously, the flow actuator comprises an oscillating surface.

The passageway may be configured to have an aspect ratio such that a powder is entrained into a gas flow from the cavity and a powder is expelled from the passageway towards a liquid by impulses of gas formed in the passageway by the flow actuator.

According to another aspect of the invention, there is provided a domestic appliance comprising an apparatus for mixing a powder in a liquid.

According to another aspect of the invention, there is provided an apparatus for mixing baby formula in a liquid comprising an apparatus for mixing a powder in a liquid.

According to another aspect of the invention, there is provided a mixed drink dispenser comprising an apparatus for mixing a powder in a liquid.

According to another aspect of the invention, there is provided a method of mixing a power in a liquid, comprising disposing a powder in a cavity communicating with a passageway, and inducing an oscillating gas flow in the passageway so that a powder is drawn into the passageway from the cavity when the gas flows in one direction and the powder is driven from the passageway towards a liquid by synthetic jetting when the gas flows in the opposite direction.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
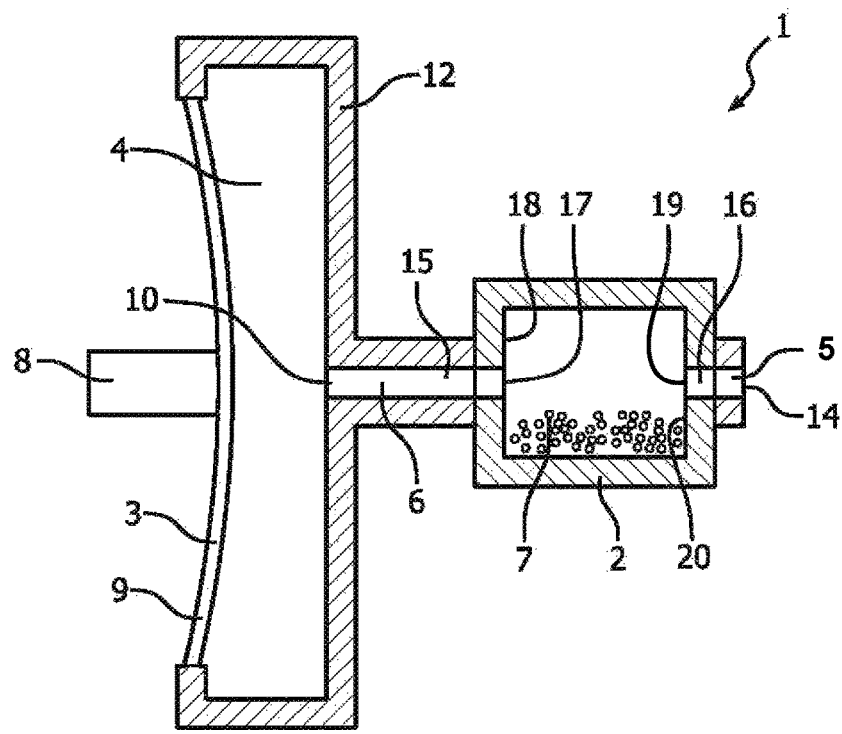
FIG. 1 shows a diagrammatic cross-sectional view of an apparatus for mixing a powder in a liquid.

Referring to FIGS. 1 to 4, an apparatus for mixing a powder with a liquid is shown. The apparatus comprises a main body 1 which is disposed in a housing (not shown) and a capsule 2 disposed in the main body 1.

The main body 1 has a flow actuator 3 which acts in an actuating chamber 4, an outlet nozzle 5, and a gas passageway 6 which communicates the actuating chamber 4 with the outlet nozzle 5. The capsule 2 forms a powder cavity 7 which is disposed along the gas passageway 6, between the actuating chamber 4 and the outlet nozzle 5. The powder cavity 7 is configured to receive a dry powder to be mixed with a liquid.

The flow actuator 3 comprises a driving element 8, such as an electromagnetic driver, a piezoelectric driver or a mechanical driver, for example a piston, and an actuating element 9, such as a membrane or a diaphragm.

The driving element 8 is disposed in the actuating chamber 4, and the driving element 8 acts on the actuating element 9 to urge the actuating element 9 to oscillate in the actuating chamber 4 and act on a gas, such as air, in the actuating chamber 4.

An aperture 10 is formed in a wall 12 of the actuating chamber 4 to fluidly communicate the actuating chamber 4 with the gas passageway 6. The gas passageway 6 is a conduit which extends from the actuating chamber 4 to the outlet nozzle 5 forming an outlet of the gas passageway 6. The outlet nozzle 5 defines an orifice 14 to the surrounding atmosphere which is disposed at a distal end of the gas passageway 6 to the actuating chamber 4.

The powder cavity 7 is disposed along the gas passageway 6 between the actuating chamber 4 and the outlet nozzle 5. The powder cavity 7 is disposed adjacent to the outlet nozzle 5, and separates the gas passageway 6 into a first section 15 and a second section 16. The first section 15 extends between (a)(i) the aperture 10 of the actuating chamber 4 and (a)(ii) a first opening 17 in the powder cavity 7 at a rear end 18 of the (i.e., corresponding to a rear-end wall of capsule 2), and the second section 16 extends between (b)(i) a second opening 19 in the powder cavity 7 at a front end 20 of the cavity (i.e., corresponding to a front-end wall of capsule 2) and b(ii) the outlet nozzle 5. The first and second sections 15, 16 of the gas passageway 6 are aligned along the same longitudinal axis, and the first and second openings 17, 19 in the powder cavity 7 oppose each other (i.e., on different walls of the cavity that correspond to the rear end 18 (or rear-end wall of the capsule 2) and front end 20 (or front-end wall of the capsule 2), respectively, as shown in FIG. 1).

The powder cavity 7 extends below the first and second openings 17, 19 and forms a powder receiving space in which unused dry powder lies prior to operation of the apparatus. In an alternative arrangement, the powder cavity is disposed to one side of the first and second openings 17, 19.

In the present embodiment, the powder cavity 7 forms part of the removable capsule 2. The capsule 2 is removable from the main body 1 of the apparatus and so the powder cavity 7 is removable from between the first and second sections 15, 16 of the gas passageway 6. It will be appreciated that the powder cavity 7 is formed along the gas passageway 6 and so forms part of a gas flow path together with the first and second sections 15, 16 of the gas passageway 6 when the powder cavity 7 is disposed in the main body 1. Although the powder cavity 7 is replaceable in the present embodiment, it will be appreciated that in an alternative embodiment the powder cavity 7 is integrally formed with the gas passageway 6, and the apparatus does not include a removable capsule. The powder cavity 7 in the present embodiment is enclosed, and communicates with the first and second sections 15, 16 of the gas passageway 6 only. However, in an alternative embodiment the powder cavity 7 has a vent at an upper end which communicates the powder cavity 7 with outside the apparatus.

Figure 4:
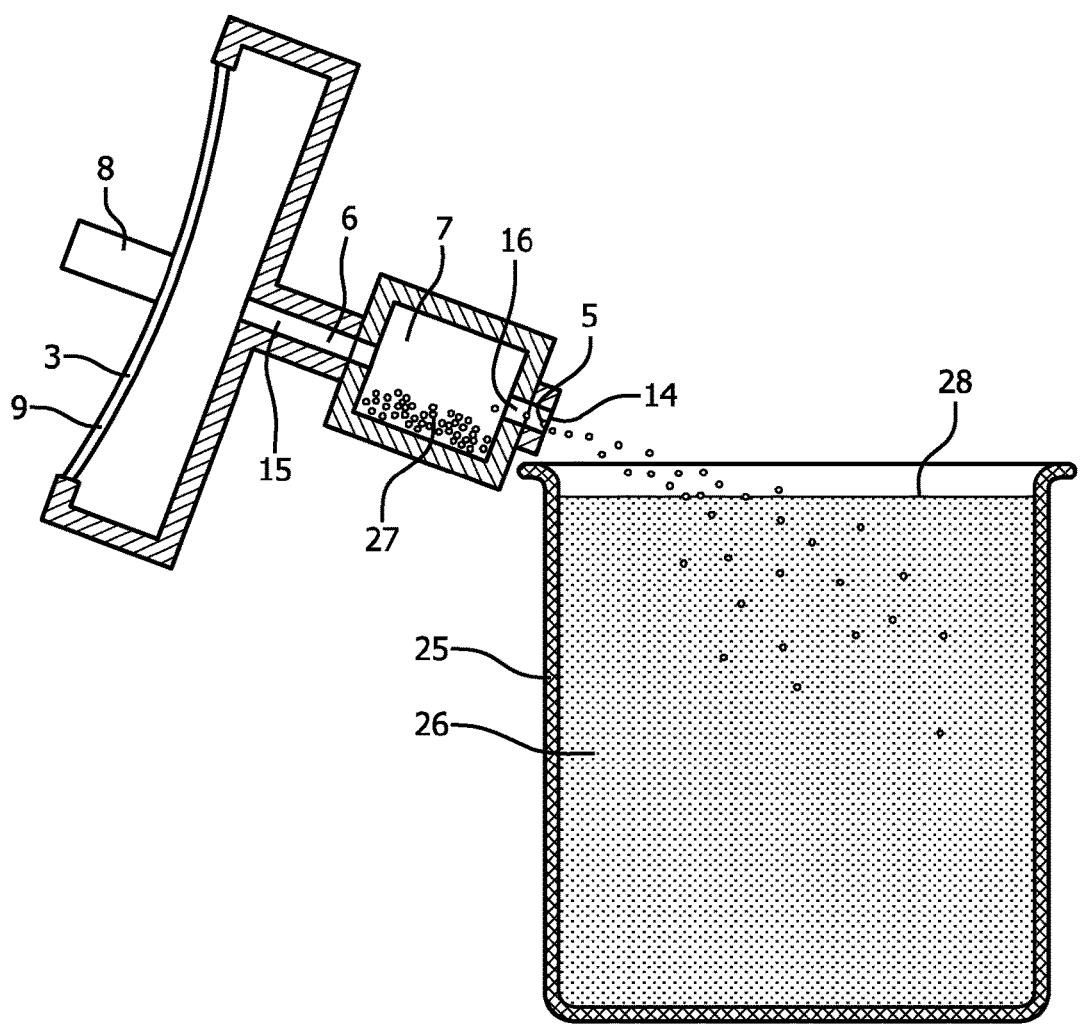
FIG. 4 shows a diagrammatic cross-sectional view of an apparatus for mixing a powder in a liquid showing powder ejected from a nozzle being injected into a liquid in a container.

Referring to FIG. 4, a container 25 for receiving a liquid 26 in which a powder 27 ejected from the orifice 14 is to be mixed is shown. The longitudinal axis of the gas passageway 6 extends at an angle to the plane of a surface 28 of the liquid received in the container in which a powder is to be mixed. Therefore, powder 27 ejected from the orifice 14 is directed towards the liquid in the container, as will become apparent hereinafter. The container 25 is disposed on a container support (not shown) to locate the open end of the container 25 with respect to the outlet nozzle 5.

The angle of the longitudinal axis of the gas passageway 6 to the plane of a surface 28 of the liquid received in the container in which a powder is to be mixed is in the range of 10 degrees to 45 degrees, so that powder does not fall from the passageway if the angle is too steep, and the jet of gas does not reflect off the water surface if the angle is too shallow. The distance between the orifice 14 and the surface of the water is preferably less than 25 mm.

In the present embodiment, the gas passageway is circular in cross-section although alternative cross-sectional arrangements are envisaged. It will be appreciated that the formation of a jet of gas due to alternating flow is dependent on the geometry of the orifice 14. With reference to R. Holman, Y. Utturkar, R. Mittal, B. L. Smith, and L. Cattafesta; Formation criterion for synthetic jets; AIAA Journal, vol. 43(10), pp. 2110-2116, 2005, the criterion for synthetic jet formation poses a limit to the Strouhal number, Sr, and this limit depends on the orifice's geometry:

$$Sr = fd/v < k_{jet},$$

For example, where $$k_{jet} \approx 0.63,$$

for a axis-symmetric orifice, $$k_{jet} \approx 0.075,$$

for a rectangular 2D orifice.

Here, f is the frequency, d is the jet nozzle diameter or height, and v is the maximum velocity during a cycle.

Operation of an apparatus for mixing a powder in a liquid will now be described with reference to the Figures.

The capsule 2 is received in the main body 1 and so the powder cavity 7 forms part of a gas flow path together with the first and second sections 15, 16 of the gas passageway 6. The capsule 2 has a charge of dry powder 27 in the powder cavity 7, and so it will be appreciated that the supply of powder may be replaced by replacing the capsule 2, or by a user refilling the capsule 2 and reinserting in the main body 1. It is envisaged that the capsule will be a consumable product and so will be replaced by a new capsule after use, however it will be appreciated that the capsule may be reusable and/or refillable. An advantage of a removable capsule 7 is that the apparatus is easily refilled with a charge of dry powder after each operation of the apparatus. Furthermore, different types of powder may be used, with minimal contamination between of different powders, and the correct quantity of powder will be disposed in the powder cavity 7. In addition, it is possible to provide a sterile product, for example baby formula, and having clean containers with dry powder will help mixing of the powder with a liquid, because most powders are hygroscopic and so they tend to attract water from the air and start to form lumps after the package has been exposed to air for short period.

The container 25 holding a liquid 26 to be mixed with the powder 27 is placed adjacent to, but spaced from, the outlet nozzle 5. The longitudinal axis of the gas passageway 6 extends at an acute angle to the surface 28 of the liquid 26 in the container 25, as shown in FIG. 4, so that the nozzle 5 is inclined towards the liquid 26.

To operate the apparatus, power is supplied to the driving element 8 of the flow actuator 3 from a power supply unit (not shown), so that the driving element 8 vibrates. The driving element 8 acts on the actuating element 9 and causes the actuating element 9 to oscillate in the actuating chamber 4. The actuating element 9 therefore acts on the gas, such as air, in the actuating chamber 4 and causes the pressure in the actuating chamber 4 to oscillate due to the change in volume. The flow actuator 3 generates an oscillating pressure difference at the opening 10 to the gas passageway, and so a high velocity reciprocating gas flow is produced along the gas flow path. In the present embodiment, the reciprocating gas flow in the range 50 Hz-350 Hz, and preferably has a frequency of about 100 Hz.

Figures 2, 3:
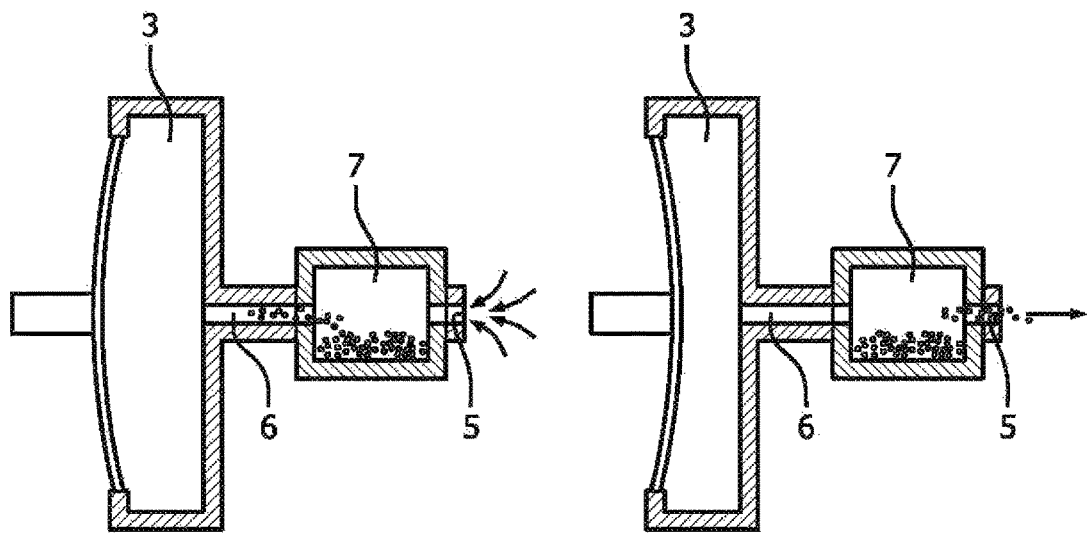
FIG. 2 shows a diagrammatic cross-sectional view of an apparatus for mixing a powder in a liquid with the powder entrained in the gas flow.
FIG. 3 shows a diagrammatic cross-sectional view of an apparatus for mixing a powder in a liquid with the powder being ejected from a nozzle towards a liquid.

When the flow actuator 3 is operated the gas flow in the gas passageway 6 reciprocates between a suction phase, as shown in FIG. 2, and a blowing phase, as shown in FIG. 3. During the suction phase, when a reduced pressure is formed in the actuating chamber 4 by the flow actuator 3, a gas, such as air, is drawn along the gas passageway 6 from the outlet nozzle 5 towards the actuating chamber 4 in a first direction. The gas, such as air, is drawn into the gas flow path through the outlet nozzle 5 from the surrounding or ambient gas. As the gas is drawn along the gas passageway 6 during the suction phase dry powder particles 27 are entrained into the gas flow from the powder cavity 7.

During the blowing phase, the gas in the gas flow path is urged to flow in a second direction, opposite to the first direction, along the gas passageway 6 from the actuating chamber 4 to the outlet nozzle 5. The gas flowing in the gas passageway 6 with powder particles entrained in it is expelled from the outlet nozzle 5.

The reciprocating gas flow produces a synthetic jet. As the stream of gas in the gas passageway 6 flows from the outlet nozzle 5 a synthetic jet is formed. A synthetic jet flow is a zero net mass flux jet which synthesises a jet flow from the surrounding or ambient gas, as opposed to a jet flow generated by an external source of fluid. p The synthetic jet is produced by the interactions of a train of vortices formed by the alternating momentary ejection and suction of a gas, such as air, across the orifice formed by the outlet nozzle 5. It will be appreciated that the synthetic jet is produced by the amplitude of the oscillations of the gas flow in the gas passageway 6 being large enough to induce flow separation at the outlet nozzle 5, and without the need for a fan, which minimises losses and increased efficiency.

The powder cavity 7 is disposed adjacent to the outlet nozzle 6 so that the powder disposed in the powder cavity 7 is picked up during the suction phase and is effectively delivered from the outlet nozzle 6 during the blowing phase.

The jet of gas entrained with powder particles is directed from the outlet nozzle 6 towards the surface 28 of the liquid 26, as shown in FIG. 4. The detached flow of the jet of gas has a sufficiently small Strouhal number such that a directed jet of gas is formed and that there is asymmetry between the suction and blowing phases, in which gas is drawn through the orifice 14 from all directions during the suction phase and is expelled through the orifice 14 as a directed jet during the blowing phase.

The powder particles entrained in the gas flow during the suction phase are therefore expelled toward the surface of the liquid at a high velocity during the blowing phase. The powder particles moving at a high speed therefore overcome the surface tension of the liquid and this results in the effective mixing of the powder particles in the liquid, and so a turbid solution is rapidly achieved.

An advantage of producing a jet of gas to direct the powder to the liquid in which the powder is to be mixed is that the jet of gas is well-defined and collimated. Therefore, it is possible to accurately point it towards the liquid 26 because it does not diverge. Furthermore, as the jet of gas moves at a high speed, it allows more of the powder to break the liquid meniscus and result in vigorous mixing and the pulsed nature of the jet results in continuous disruption of the interfacial gas layer above the liquid, assisting the dispersal and subsequent mixing of the powder into the fluid.

It will be appreciated that the term "comprising" does not exclude other elements or steps and that the indefinite article "a" or "an" does not exclude a plurality. A single processor may fulfil the functions of several items recited in the claims. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. An apparatus for mixing a powder in a liquid comprising:

a cavity for holding a powder;

a passageway communicating with the cavity;

a flow actuator configured to induce an oscillating gas flow in the passageway, wherein the powder held in the cavity exits the cavity and is drawn into the passageway from the cavity when gas flows in a first direction through the passageway during a suction phase, and wherein the powder drawn into the passageway in the suction phase is expelled from the passageway towards the liquid by synthetic jetting when the gas flows through the passageway in a second direction opposite the first direction during a blowing phase; and an outlet nozzle through which the powder is expelled by the synthetic jetting from the passageway during the blowing phase, wherein the cavity is disposed along the passageway between the flow actuator and the outlet nozzle, the cavity separating the passageway into a first section and a second section, wherein the first section and the second section are connected to the cavity on different walls of the cavity.

2. The apparatus according to claim 1, wherein the cavity is disposed adjacent to the outlet nozzle.

3. The apparatus according to claim 1, configured to hold a container of the liquid in which the powder is to be mixed.

4. The apparatus according to claim 3, wherein the passageway defines a longitudinal axis, and the longitudinal axis of the passageway is configured to extend at an angle towards a surface of the liquid received in the container.

5. The apparatus according to claim 1, wherein the cavity is removable from the passageway.

6. The apparatus according to claim 5, wherein the cavity forms part of a disposable capsule.

7. The apparatus according to claim 1, wherein the flow actuator comprises an oscillating surface separate from a surface of the cavity.

8. The apparatus according to claim 1, wherein the passageway is configured to have an aspect ratio such that a powder is entrained into the gas flow from the cavity and the powder is expelled from the passageway towards the liquid by impulses of gas formed in the passageway by the flow actuator.

9. The apparatus according to claim 1, wherein the gas flow is drawn into the outlet nozzle from all directions during the suction phase, and wherein powder entrained into the gas flow is expelled through the outlet nozzle as a directed jet of gas during the blowing phase, the directed jet of gas being collimated.

10. The apparatus according to claim 1, wherein the flow actuator comprises an actuating chamber having an oscillating surface, wherein the actuating chamber is separate from the cavity, the actuating chamber being separated from the cavity by the passageway.

11. The apparatus according to claim 1, wherein the cavity disposed along the passageway extends above and below the passageway.

12. A method of mixing a powder in a liquid, comprising acts of:
    disposing the powder in a cavity communicating with a passageway; and
    inducing an oscillating gas flow in the passageway by a flow actuator,
    wherein the inducing act comprises an act of suction and an act of blowing,
    wherein the suction act draws the powder in the cavity out of the cavity and into the passageway from the cavity when gas flows through the passageway in a first direction,
    wherein the blowing act drives the powder drawn into the passageway in the suction act from the passageway towards the liquid by synthetic jetting through an outlet nozzle when the gas flows through the passageway in a second direction opposite the first direction, and
    wherein the cavity is disposed along the passageway between the flow actuator and the outlet nozzle, the cavity separating the passageway into a first section and a second section, wherein the first section and the second section are connected to the cavity on different walls of the cavity.

13. An apparatus for mixing a powder in a liquid comprising:
    a cavity for holding the powder;
    a passageway communicating with the cavity;
    a flow actuator configured to induce an oscillating gas flow in the passageway, wherein the powder held in the cavity exits the cavity and is drawn into the passageway from the cavity when gas flows in a first direction through the passageway during a suction phase, and wherein the powder drawn into the passageway in the suction phase is expelled from the passageway towards the liquid by synthetic jetting when the gas flows through the passageway in a second direction opposite the first direction during a blowing phase; and
    an outlet nozzle through which the powder is expelled by the synthetic jetting from the passageway during the blowing phase,
    wherein the cavity is disposed along the passageway between the flow actuator and the outlet nozzle, the cavity separating the passageway into a first section and a second section, wherein the first section and the second section are connected to the cavity on different walls of the cavity, and
    wherein the gas flow is drawn into the outlet nozzle from all directions during the suction phase, and wherein powder entrained into the gas flow is expelled through the outlet nozzle as a directed jet of gas during the blowing phase, the directed jet of gas being collimated and not substantially diverging after being expelled.

* * * * *